United States Patent [19]

Prucnal et al.

[11] Patent Number: 5,828,474
[45] Date of Patent: Oct. 27, 1998

[54] OPTICAL APPARATUS FOR TRANSMITTING DATA OF AN ELECTRICAL SIGNAL

[75] Inventors: Paul R. Prucnal, Princeton; Warren S. Warren, Lawrenceville, both of N.J.

[73] Assignee: The Trustees of Princeton University, Princeton, N.J.

[21] Appl. No.: 758,437

[22] Filed: Nov. 29, 1996

Related U.S. Application Data

[60] Provisional application No. 60/008,751 Dec. 18, 1995.
[51] Int. Cl.[6] .............................. H04J 4/00; H04J 14/00
[52] U.S. Cl. ........................................................... 359/123
[58] Field of Search .................................. 359/123–124, 359/126, 130, 135, 138, 181–182, 285; 385/7

[56] References Cited

U.S. PATENT DOCUMENTS 5,073,980  12/1991  Prucnal et al. .......................... 359/140
5,450,223   9/1995  Wagner et al. .......................... 359/124
5,493,433   2/1996  Prucnal et al. .......................... 359/123
5,526,171   6/1996  Warren .................................... 359/285

*Primary Examiner*—Kinfe-Michael Negash
*Attorney, Agent, or Firm*—Watov & Kipnes, P.C.

[57] ABSTRACT

A plurality of Acoustic Optic Modulators(AOM) are employed in the transmission subsystem of an optical data communication system for modulating different wavelengths of laser received from a grating with an electrical or radio frequency signal containing data or information to be transmitted. The modulated wavelengths of light associated with each AOM are recombined to form a shaped laser beam via a grating prior, and the shaped beams of laser light are multiplexed together for transmission over a fiber optic cable. A receiving station includes an optical decoding system for demultiplexing the shaped laser pulses, and for each shaped laser pulse detecting the individual modulated wavelengths of light comprising a desired spectrum, for extracting the data or desired information contained in each channel or wavelength of interest.

6 Claims, 1 Drawing Sheet

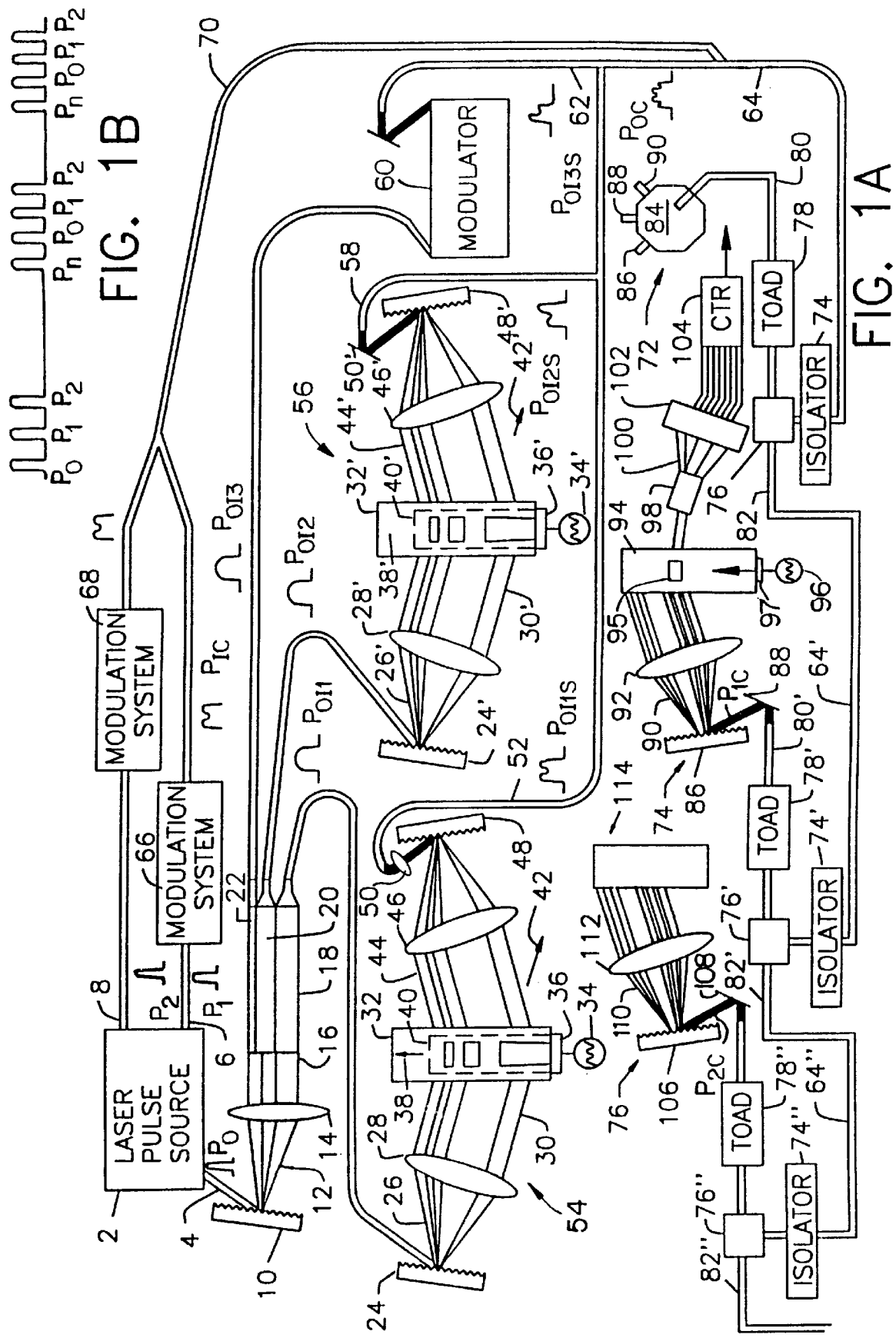

OPTICAL APPARATUS FOR TRANSMITTING DATA OF AN ELECTRICAL SIGNAL

RELATED APPLICATION

This Application is related to co-pending Provisional application Ser. No. 60/008,751, filed Dec. 18, 1995, and also entitled "Optical Apparatus For Transmitting Data Of An Electrical Signal". The teachings of the related Provisional Application are incorporated herein in entirety to the extent that the teachings do not conflict herewith.

FIELD OF THE INVENTION

The present invention relates generally to the field of data transmission and communication, and more particularly to the use of optical apparatus for transmitting data.

BACKGROUND OF THE INVENTION

It is known that data contained in an electrical signal can be conveyed from one point to another by using it to shape a pulse of light that is conveyed by an optical fiber transmission line to a receiving point where the data is recovered.

One way of doing this is to linearly disperse the spectrum of pulses of laser light along a line of liquid crystals that are respectively modulated with parallel fed electrical signals occurring in the frames between pulses so as to modulate the intensity of light in different portions of the spectrum. The spectral content of the light emerging from the crystals is altered because of the modulation. The spectral dispersion is then reversed, giving pulses with shapes (temporal profiles) which reflect the modulation imposed by the liquid crystals. These shaped pulses are conveyed via an optical transmission line to a receiving point, where they can be decoded (for example) by linearly dispersing their spectrum along a line of photodetectors that producing them electrical signals corresponding to the modulation.

In U.S. Pat. No. 5,526,171 entitled "Laser Pulse Shaper", and issued on Jun. 11, 1996, an acoustic optical crystal is used in place of the liquid crystals described above. The electrical signal voltage is continually applied to the crystal by a transducer so as to cause an acoustic wave to pass through an aperture containing the linearly dispersed spectrum. If the signal is an unmodulated carrier wave, the light passing through the crystal is diffracted by the Bragg angle but otherwise not affected, but if the carrier wave is amplitude or phase modulated, corresponding changes in the index of refraction occur in the crystal so as to modulate the intensity of the light passing through it at a Bragg angle at each point along the aperture. The motion of the acoustic waves through the crystal is effectively stopped or strobed because the incident pulses of laser light are so short that they pass completely through the crystal before any significant advance of the acoustic wave occurs. Thus the crystal acts like a modulated grating.

As described in U.S. Pat. No. 5,073,980, entitled "Photonic Switch Employing Shared Data Transmission Facility" that issued on Dec. 17, 1991, optical time division multiplexing can be used to distribute a plurality of messages, each of which has a time position relative to a frame, which is indicative of the message destination address.

In U.S. Pat. No. 5,493,433 entitled "Terahertz Optical Asymmetric Demultiplexer", and issed on Feb. 20, 1996, apparatus is described for selecting individual pulses from a series of input pulses occurring at a terabit rate. This apparatus is referred to hereinafter as "TOAD".

SUMMARY OF THE INVENTION

In the apparatus just described, only one frame of data is transmitted for each laser pulse, but in accordance with this invention a plurality of frames of data, e.g. 6,000, are transmitted for each laser pulse so that data transmission occurs at a terabit rate. Instead of providing a single train of laser pulses, a plurality of interleaved time division multiplexed trains of pulses are provided so that pulses from each train occur within the frame intervals of a first train.

The pulses of each train are dispersed into their spectrum, and what will be referred to as interim pulses are formed from different portions of the spectrum. The interim pulses are spectrally dispersed into frequency channels that are modulated as in the previously described apparatus to form respective shaped interim pulses for each channel that are summed so as to form composite shaped interim pulse for each train. The latter pulses are introduced into an optical transmission line that conveys them to a receiving point. Since the composite shaped interim pulses occur at different respective times within a frame, they are separated from each other on a time basis by a demultiplexer such as described in the U.S. Pat. No. 5,493,433, previously referred to. Each composite shaped pulse is then dispersed into its frequency channels and the optical data of each channel is converted into electrical form by a suitable detector.

BRIEF DESCRIPTION OF THE DRAWINGS

The invention is described with reference to the drawings, in which like items are identified by the same reference designation, wherein:

FIG. 1A is a block diagram of a data transmission system incorporating one embodiment of the invention; and FIG. 1B illustrates the timing of pulses used the system of FIG. 1A.

DETAILED DESCRIPTION OF THE INVENTION

In FIG. 1A, a laser pulse source 2 provides a plurality of time division multiplexed trains of pulses of laser light on separate outputs thereof. Although a large number of trains can be used, only three, respectively appearing on optical fibers 4, 6 and 8 are shown. In FIG. 1B, the three trains of laser pulses are respectively indicated by pulses $P_0$, $P_1$, and $P_2$ that respectively appear in fibers 4, 6, and 8. The pulses $P_1$ and $P_2$ occur immediately after the pulses $P_0$ so as to appear within frames between the pulses $P_0$, but many more pulse trains could be used so that the pulses $P_n$ of an nth train can occur at the very end of a frame, ie, just prior to the next pulse $P_0$. Thus, a frame between pulses of one frame will contain one pulse from each of the other trains. The width of the spectrum of the pulses is inversely proportioned to the width or time duration of the pulse, which is preferably less than 100 fs(femtosecond). Note that 100 fs would be a good choice (it would give a pulse with about the same bandwidth as a good fiber or amplifier) but longer or shorter pulses might also be possible.

The trains of pulses can be provided in any suitable manner as long as they are properly synchronized. If only one laser is used, the trains of pulses can be provided by delaying different portions of light from a laser by different amounts, but each train can be provided by a different laser. It is also possible to use a number of lasers less than the number of trains of pulses required and derive a plurality of trains from each laser by providing suitable delays. Furthermore, the trains of pulses could be provided by sources in different locations as long as they are properly synchronized.

FIG. 1A illustrates the processing of pulses in the train of $P_0$ laser pulses that are conveyed in the fiber optic element 4, but all the other trains will be processed in the same manner.

The laser pulses $P_0$ are directed to a means such as a grating 10 for forming a linear dispersion of the frequency components in their spectrum as indicated by the divergent paths 12. A lens 14 is preferably provided for collimating the frequency components as indicated at 16. Different portions of the frequency components 16 are introduced into a plurality of optical fibers, herein shown as being fibers 18, 20 and 22 of different diameters. In certain applications the fibers 18, 20, and 22 may have the same diameter or only one fiber might be used. Light within the fibers 18, 20 and 22 forms what are hereinafter referred to as interim pulses $P_{0i1}$, $P_{0i2}$ and $P_{0i3}$ in response to each laser pulse, but because they might be formed from only a portion of the spectrum of the laser pulse $P_0$, they might be longer so as to be up to about 200 ps(picoseconds).

The processing of all the trains of interim pulses $P_{0i1}$, $P_{0i2}$ and $P_{0i3}$ is the same but only the components for processing the pulses $P_{0i1}$ are now described. Corresponding components for processing the interim pulses $P_{0i2}$ are designated by the same numbers primed. The interim pulses $P_{0i3}$ are processed in the same manner in a modulator 60.

The interim pulses $P_{0i1}$ are directed via the optical fiber 18 to a means such as a grating 24 for linearly dispersing their frequency components along divergent paths 26. A lens 28 collimates the light in the divergent paths 26 along parallel paths 30. An acousto-optic crystal 32 is mounted so as to intercept the parallel paths 30 at Bragg's angle, and a source 34 of electrical voltage signals excite a transducer 36 so as to cause corresponding pressure waves to propagate through the crystal 32 in the direction of the arrow 38. The distance that the pressure waves propagate through the crystal 32 in the frame interval between successive laser pulses $P_0$ and of interim pulses $P_{0i1}$ is an aperture 40.

If the signal from the source 34 is an unmodulated sinusoidal wave for an entire frame, the light in the paths 30 continues through the crystal 32 in the same direction as indicated by the arrow 42, but when the sinusoidal wave is modulated at a given point, a portion of the light in the paths 30 that impinges on the crystal 32 at that point is deflected so as to emerge from the crystal 32 at the Bragg angle. The portion of the light so deflected depends on the amplitude of the modulation. In the drawing, the sinusoidal wave, not shown, is modulated at different portions of the aperture 40 as generally indicated by the little rectangles in the aperture 40, so as to cause corresponding portions of light in the paths 30 to emerge from the crystal 37 at the Bragg angle as indicated at 44.

A lens 46 focuses light in the collimated paths 44 onto a grating 48 that forms shaped interim pulses $P_{0i1s}$ which can be introduced by any suitable means such as a lens 50 for focusing the light into an optical transmission line 52. As illustrated, the shaped interim pulse $P_{0i1s}$ has the same width or duration as the interim pulse $P_{0i1}$, but has a depression in its top portion to illustrate a modulation.

The components just described in relation to the crystal 32 comprise a modulator 54. A modulator 56 having the same components as the modulator 54 that are indicated by primed numerals modulates the interim pulses $P_{0i2}$ on the fiber 20 so as to produce shaped interim pulses such as the pulse $P_{0i2s}$ on a fiber 58. The pulse $P_{0i2s}$ has the same duration as the unmodulated interim pulse $P_{0i2}$, but both have greater duration than the interim pulse $P_{0i1}$, because the portion of the frequency components 16 in the fiber 20 is less than the portion in the fiber 18. In this particular example, however, the pulse $P_{0i2}$ is shown as having an indentation due to modulation on its left side.

Although not shown in detail, a modulator 60 having the same structure as the modulators 54 and 56 operates on the interim pulses $P_{0i3}$ from the fiber 22 to produce in a fiber 62 shaped or modulated interim pulses $P_{0i3}$ that in this particular example has an indentation due to modulation on its right side.

All of the shaped interim pulses $P_{0i1s}$, $P_{0i2s}$, and $P_{0i3s}$ in the respective fibers 52, 58 and 62 are summed by twisting the fibers together and fusing them at one point or another as described in the U.S. Pat. No. 5,073,980 so as to produce a composite shaped interim pulse $P_{0c}$ that is introduced into an optical fiber transmission line 64.

All of the other trains of laser pulses such as $P_1$ and $P_2$ are processed in the same way as just described in connection with the laser pulses of the $P_0$ train except that the number of interim pulses and their durations may vary. As shown, the $P_1$ train is processed by a modulation system 66 to produce composite shaped interim pulses $P_{1c}$, and the $P_2$ train is processed by a modulation system 68 so as to produce shaped interim composite pulse $P_{2c}$. In one way or another, as by a fiber 70, composite shaped interim pulses $P_{1c}$ and $P_{2c}$ are introduced into the optical transmission line 64 to which the composite shaped interim pulse $P_{0c}$ has been introduced. The sequence of the shaped interim composite pulses is preferably the same as the laser pulses $P_0$, $P_1$, $P_2$, ... $P_n$. Since the distances the various pulses have to travel may be different in different systems, various delays may have to be introduced at appropriate points to obtain the given timed sequence on the optical transmission line 64.

At receiving stations along the optical transmission line 64, the appropriate one of the shaped interim composite pulses $P_{0c}$, $P_{1c}$, and $P_{2c}$ is selected from its time slot by a TOAD and directed to a signal detector that produces the desired electrical signals. Although this could be done in a number of ways such as by providing respective addresses, it is suggested that a terabit optical asymmetric demultiplexer TOAD described in the U.S. Pat. No. 5,526,171, previously referred to be used at each station. If a TOAD demultiplexer is used at each receiving station, it is adjusted to pick off a shaped composite pulse in a particular time slot. It must first be synchronized with one of the laser pulses such as $P_0$, which would then be the zero time slot, and the composite shaped pulses for the trains $P_1$, $P_3$ would occur in time slots as indicated in FIG. 1B.

Briefly, the TOAD operates as follows. As each composite shaped interim pulse on the transmission line reaches the input of a TOAD, it introduces identical shaped pulses A and B, not shown, into a fiber loop so that the pulse A traverses the loop in one direction and the pulse B traverses it in the other. When both pulses have traversed the entire loop, they are combined. Therefore, if neither of them is phase-shifted during its traversal of the fiber, they will add constructively and be reflected from the loop, but if only one of them is phase-shifted, they will add destructively, and pass through the loop as the selected pulse. The selecting of a shaped pulse in a given time slot is attained by introducing a gating pulse into the fiber travelled by the shaped pulses A and B in such manner and time that it causes a device in the fiber to phase-shift one of A and B but not the other thereby producing a composite shaped interim pulse at its output.

If we assume that the data on the composite shaped interim pulse $P_{0c}$ provided by the summation of the outputs of the modulators 54, 56 and 60 is to be detected at a receiving station 72, the transmission line 64 is coupled via an optical isolator 74 and a coupler 76 to the input of a TOAD 78. The TOAD 78 operates to select the time slot in which the pulses $P_{0c}$ are located, and to produce the desired composite shaped interim pulse $P_{0c}$ at its output 80. The coupler 76 is such as to produce the complement of the output 80 at an output 82. Another section 64' of this transmission line 64 is connected to the output 82 of the coupler 76 so as to carry all the composite shaped interim pulses except the $P_{0c}$ pulse that was withdrawn from the stream of pulses at the receiving station 72. Thus, although in this example the first pulse $P_{0c}$ in a sequence was to be used by the first receiving station 72 along the transmission line 64, any of the composite pulses could be selected by the TOAD 78, and the others would be passed along for selection by other receiving stations.

A receiving station 74 uses a TOAD arrangement like that of the receiving station 72 in which corresponding components are designated by the same numbers primed for selecting the time slot of the composite pulse $P_{1c}$ from the modulation system 66.

A receiving station 76 uses a TOAD arrangement like that of the receiving station 72 in which corresponding components are designated by the same numbers with a double prime for selecting the time slot of composite shaped interim pulse $P_{2c}$ produced by the modulation system 68.

Detection of the composite modulated signals in the time slots selected by the TOAD's can be effected in a number of ways.

At the receiving station 72, for example, the composite interim light pulse $P_{0c}$ in one time slot is selected by the TOAD 78 and applied to channel dropping filter 84 that supplies single frequencies of light at their respective outputs 86, 88 and 90. In practice there would be many more outputs than shown. Each frequency or wavelength of light is modulated so as to be a digital "1" or "0" so that different bits appear at the outputs 86, 88, and 90 at the same time.

At the receiving station 74, the composite shaped interim pulse $P_{1C}$ in a different time slot is selected by the TOAD 78' and applied to a grating 86 via a mirror 88. The grating 86 disperses the frequency components of $P_{1C}$ as indicated at 90, and a lens 92 collimates them. A crystal 94 of an acousto-optic modulator (AOM) is mounted so as to intercept the collimated light at a Bragg angle and the position 95 of a modulated pressure sine wave supplied by a source 96 to a transducer 97 causes a desired portion of the spectrum to exit the crystal 94 at the Bragg angle. An interferometer 98 disperses this portion of the spectrum, as indicated at 100, onto a series of photodiodes 102. Since all diodes 102 are activated at the same time, the sequence of the signals that occurred in modulators 34 and 34' can be restored by use of a synchronized counter 104.

At the receiving station 76, the composite shaped interim pulse $P_{2C}$ is selected from its time slot by the TOAD 78" and directed to a grating 106 via a mirror 108. The grating 106 disperses the spectrum of $P_{2C}$ as indicated at 110, and a lens 112 collimates the dispersed light 110. Diodes of an array 114 are mounted so as to receive different frequencies or wavelengths of collimated light. If the pulse $P_{2C}$ has 1,000 frequencies, one bit could be modulated on each frequency, and the array 114 would have 1000 diodes.

Although various embodiments of the invention are shown and described herein, they are not meant to be limiting. Those of skill in the art may recognize various modifications to these embodiments, which modifications are meant to be covered by the spirit and scope of the appended claims.

What is claimed is:

1. Communication apparatus comprising:

means for providing a plurality of synchronized trains of optical pulses;

means for spatially separating the frequency components of the pulses of each of said trains into a plurality of optical channels;

means for respectively modulating the frequency components of each optical channel;

means for deriving the sum of the modulated frequency components of the optical channels of each train of pulses;

means for causing the sums derived from each train of pulses to occupy respective time slots between successive pulses of each train;

means for selecting the sum of the modulated frequency components for the channels of each train of pulses;

means for dividing each sum into its channels; and means for deriving the modulated components of each channel.

2. A system for a data transmission network comprising:

means for producing equally spaced pulses of coherent light at respective outputs;

means for deriving interim pulses from respective portions of the spectrum of pulses of coherent light at each of said outputs;

means for deriving a plurality of frequency channels from each interim pulse;

means for respectively modulating the frequency channels derived from each interim pulse;

means for respectively summing the modulated frequency channels for each interim pulse to form a shaped interim pulse;

means for summing the shaped interim pulses derived from the pulses of coherent light at each of said outputs to form respective composite shaped interim pulses; and means for time division multiplexing said composite shaped interim pulses onto a common transmission line.

3. A system as set forth in claim 2, wherein said means for time division multiplexing said composite shaped interim pulses is comprised of means for time division multiplexing said pulses of coherent light.

4. A time division multiplexing system as set forth in claim 2 wherein:

said means for deriving said interim pulses includes a grating and a collimating means;

said means for deriving a plurality of frequency channels from each of said interim pulses includes a grating and a collimating means;

said means for respectively modulating the frequency channels derived from each interim pulse includes a crystal mounted so as to intercept light from said collimating means at Bragg's angle, and a transducer for causing pressure waves to pass through said crystal;

said means for respectively summing the modulated frequency channels for each interim pulse so as to form shaped interim pulse includes a grating and a lens for focusing the channels on said grating;

said means for summing the shaped interim pulses to form the respective composite shaped interim pulses includes a plurality of optical transmission lines joined together; and said means for time division multiplexing said composite shaped interim pulse includes means for time division multiplexing the pulses of coherent light applied to said outputs.

5. A time division multiplexing system for a data transmission network as set forth in claim 2 further comprising:

means for respectively selecting each of said time division multiplexed composite shaped interim pulses;

means for deriving the modulated frequency channels of each composite shaped interim pulse; and means for detecting the modulation of each frequency channel.

6. A time division multiplexing system for a data transmission network comprising:

means for producing time division multiplexed pulses of coherent light at respective outputs;

means for deriving interim pulses from respective portions of the spectrum of pulses of coherent light at each of said outputs;

means for deriving a plurality of frequency channels from each interim pulse;

means for respectively modulating the frequency channels derived from each interim pulse;

means for respectively summing the modulated frequency channels for each interim pulse to form a shaped interim pulse; and means for summing the shaped interim pulses derived from the pulses of coherent light at each of said outputs to form respective composite shaped interim pulses.

* * * * *